(12) United States Patent
Sheaffer et al.

(10) Patent No.: US 9,471,129 B2
(45) Date of Patent: Oct. 18, 2016

(54) DETERMINING A WRITE OPERATION

(71) Applicant: Empire Technology Development LLC, Wilmington, DE (US)

(72) Inventors: Gad Sheaffer, Haifa (IL); Shmuel Ur, Galil (IL)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 41 days.

(21) Appl. No.: 14/454,121

(22) Filed: Aug. 7, 2014

(65) Prior Publication Data

US 2016/0041599 A1 Feb. 11, 2016

(51) Int. Cl.
*G06F 1/32* (2006.01)
*G06F 12/02* (2006.01)
*G06F 12/06* (2006.01)

(52) U.S. Cl.
CPC ............. *G06F 1/3225* (2013.01); *G06F 1/329* (2013.01); *G06F 1/3275* (2013.01); *G06F 12/0246* (2013.01); *G06F 12/0638* (2013.01); *G06F 2212/205* (2013.01); *G06F 2212/7201* (2013.01)

(58) Field of Classification Search
CPC .... G06F 1/32; G06F 1/3225; G06F 12/0246; G06F 12/0638; G06F 2212/205; G06F 1/329; G06F 2212/7201; G06F 1/3275
See application file for complete search history.

(56) References Cited

U.S. PATENT DOCUMENTS

| 8,365,001 B2 | 1/2013 | Ma |
| 2005/0077543 A1 | 4/2005 | Moriyama et al. |
| 2006/0227605 A1 | 10/2006 | Choi et al. |
| 2010/0217920 A1* | 8/2010 | Song .................. G06F 12/0246 711/103 |
| 2011/0010569 A1* | 1/2011 | Obr ......................... G06F 1/30 713/320 |
| 2011/0283070 A1* | 11/2011 | Rischar ............... G05B 19/042 711/162 |

FOREIGN PATENT DOCUMENTS

WO    2012091234 A1    7/2012

OTHER PUBLICATIONS

Bondurant, D. et al., "MRAM—The Future of Non-Volatile Memory?," accessed at http://web.archive.org/web/20130118222746/http://low-powerdesign.com/article_MRAM_everspin, accessed on May 23, 2014, 4 pages.

Gunaratne, P.C. and Christensen, K.J., "Predictive power management method for network devices," Electronics Letters, vol. 41 No. 13, 2 pages (Jun. 23, 2005).

(Continued)

*Primary Examiner* — David X Yi
*Assistant Examiner* — Zubair Ahmed
(74) *Attorney, Agent, or Firm* — Maschoff Brennan

(57) ABSTRACT

Technologies are generally described herein for writing data to either volatile or nonvolatile memory. An estimated time for a last write operation to occur and an estimated time to a power down event are determined. A threshold time is generated from the estimated time for a last write operation to occur and the estimated time to a power down event. The threshold time represents time at which a cost to write to volatile memory may become greater than a cost to write to nonvolatile memory. The cost may be based at least in part on the need to copy data stored in a volatile memory to be persisted after a power down event from the volatile to the nonvolatile memory.

16 Claims, 5 Drawing Sheets

(56) References Cited

OTHER PUBLICATIONS

Hu, J. et al., "Minimizing Write Activities to Non-volatile Memory via Scheduling and Recomputation," 2010 IEEE 8th Symposium on Application Specific Processors (SASP), pp. 101-106 (Jun. 13-14, 2010).

Huang, H. et al., "Cooperative Software—Hardware Power Management for Main Memory," Power-Aware Computer Systems—PACS, 10 pages (2004).

Park, S. II and Park I-C., "History-Based Mode Prediction for Improving Memory Performance," Proceedings of the 2003 International Symposium on Circuits and Systems, vol. 5, pp. V-185-V188 (May 25-28, 2003).

\* cited by examiner

DETERMINING A WRITE OPERATION

BACKGROUND

Unless otherwise indicated herein, the materials described in this section are not prior art to the claims of this application and are not admitted to be prior art by inclusion in this section.

Nonvolatile ("NV") memory technologies, such as spin transfer torque memory and phase change memory, may have many positive attributes, such as non-volatility, low leakage current and low area. However, when compared to similarly configured memory types, these types of memory technologies can have a relatively limited number of writes ("write endurance"), consume higher power on write operations, and experience slower write times. In some applications, data to be written may be written to an array of volatile memory, an array of nonvolatile memory, or both.

SUMMARY

In one example, a method to perform a write operation is described. The method includes determining an estimated power down event time, determining an estimated time prior to the estimated power down event time in which a last write operation for an application may occur, and determining a threshold time to write to a volatile memory based upon at least the determined estimated power down event time and the determined estimated time for the last write operation of the application. In response to the memory write operation being scheduled before the determined threshold time, the method further includes performing a memory write operation to the volatile memory. In response to the memory write operation being scheduled at or after the determined threshold time, the method further includes performing the memory write operation to a nonvolatile memory.

In another example, a computer-readable storage medium is described. The computer-readable storage medium includes computer-executable instructions stored therein which, in response to execution by a computer, cause the computer to perform a write operation. The computer-executable instructions to perform the write operation include instructions to determine an estimated power down event time, to determine an estimated time prior to the estimated power down event time in which a last write operation for an application may occur, and to determine a threshold time to write to a volatile memory based upon at least the determined estimated power down event time and the determined estimated time for the last write operation of the application. In response to the memory write operation being scheduled before the determined threshold time, the computer-executable instructions further includes instructions to perform a memory write operation to the volatile memory. In response to the memory write operation being scheduled at or after the determined threshold time, the computer-executable instructions further includes instructions to perform the memory write operation to a nonvolatile memory.

In a further example, an apparatus is described. The apparatus includes a processor unit and a memory controller. The memory controller is coupled to the processor unit and is configured to be responsive to the processor to perform a memory write operation to either a volatile memory or a nonvolatile memory according to a threshold time. The threshold time is based on an estimated power down event time of an application associated with the memory write operation, and an estimated time prior to the estimated power down event time in which a last write operation for the application may occur.

In another example, a memory system is described. The memory system includes a memory controller and a write location unit configured to receive one or more write location inputs and provide a write location output. The write location unit includes a cost calculator and a threshold time generator. The cost calculator is configured to use the one or more received write location inputs to determine a cost to write data to a volatile memory and a cost to write the data to a nonvolatile memory. The threshold time generator is configured to determine a threshold time, wherein the write location output is based on the determined cost to write data to the volatile memory, the determined cost to write data to the nonvolatile memory, and the determined threshold time. The memory system also includes a write logical unit coupled to the write location unit and to the memory controller. The write logical unit is configured to receive the write location output from the write location unit, and provide an output, based on the received write location output, to the memory controller to have data written to volatile memory or nonvolatile memory. The memory controller is configured to be responsive to the output from the write logical unit to cause the data to be written to the volatile memory or the nonvolatile memory based on the output from the write logical unit.

The foregoing Summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
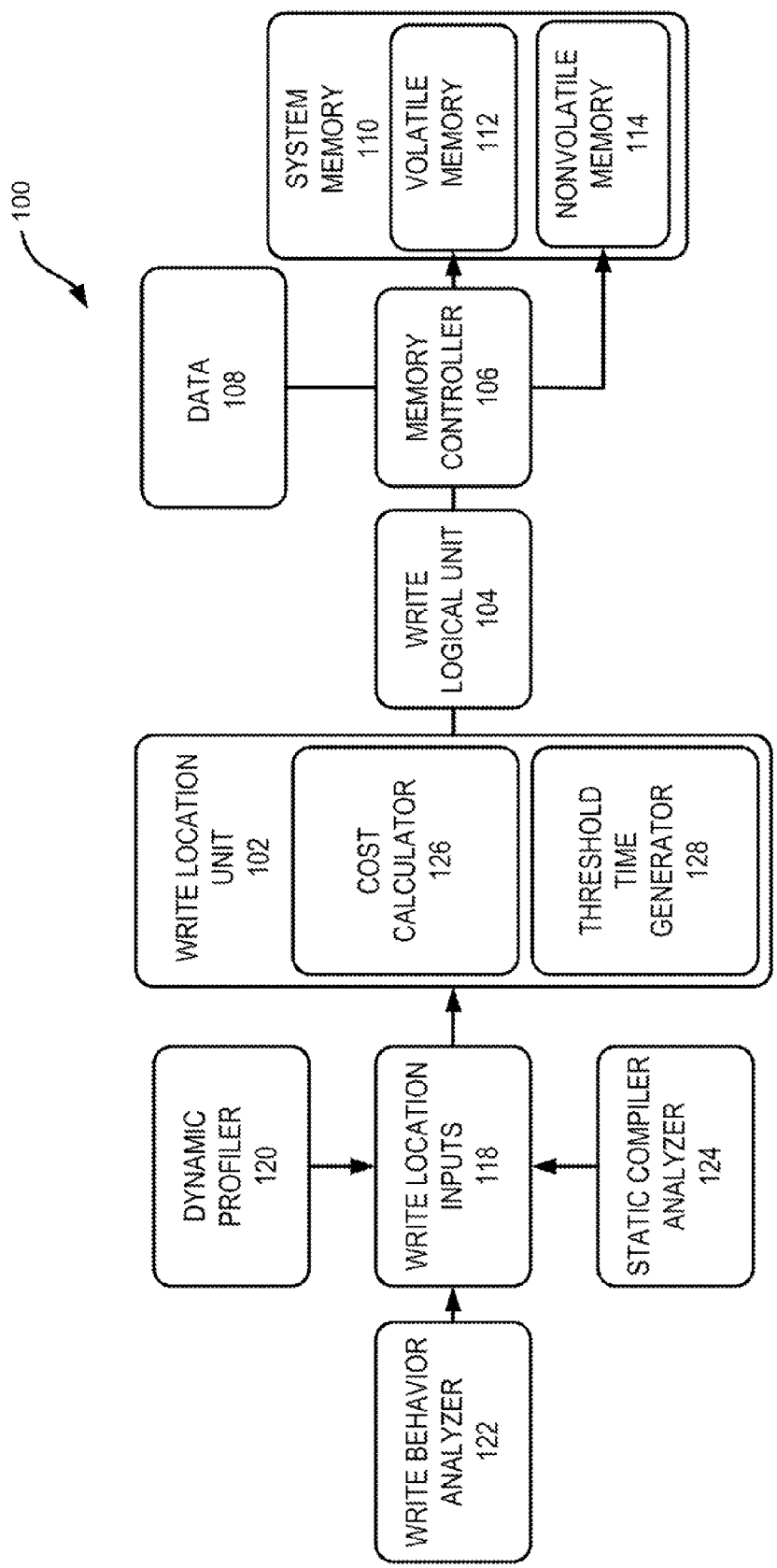
FIG. 1 is an illustration of a memory system operative to determine a write location.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein.

The aspects of the present disclosure, as generally described herein, and illustrated in the figures, can be arranged, substituted, combined, separated, and designed in a wide variety of different configurations, all of which are explicitly contemplated herein. Further, one or more components of various figures described below may not be included in the figure for purposes of clarity or brevity. This should not be construed as a disclaimer or admission that the non-included components do not form part of the subject matter described herein.

This disclosure is generally drawn, inter alia, to technologies used to determine a write operation. Various aspects of the presently disclosed subject matter determine whether to write to a nonvolatile memory or to a volatile memory based on a cost determination. A write operation may be performed on the type of memory having a relatively lower cost. The cost determination may be based at least in part on an estimated time in which a last write operation for an application may occur before a power down event.

As used herein, a "power down event" may include an occurrence in which power to a volatile memory is decreased to a point where the volatile memory may lose its ability to store data. Some examples of power down events may include, but are not limited to, a full or partial system shutdown, a sleep state, a standby mode of operation where power is removed or reduced from the volatile memory, or others. Thus, data stored in volatile memory may be lost from the volatile memory in response to an occurrence of a power down event. To avoid a loss of data, prior to the power down event, a computing system or other device may read all or a portion of the data in volatile memory and write that data to nonvolatile, or persistent, memory.

In some circumstances, the transfer of data to be persisted prior to a power down event from volatile to nonvolatile memory may be considered a cost, or penalty, associated with using volatile memory. The transfer of data may be considered a cost because of the additional computing resources consumed to move data from volatile to nonvolatile memory. A cost determination may be performed to determine a threshold time when the cost to write to the volatile memory becomes greater than the cost to write to the nonvolatile memory. If data is to be written at a scheduled time that is prior to the determined threshold time, the data is written to volatile memory. If data is to be written at a scheduled time that is at or after the determined threshold time, the data is written to nonvolatile memory.

One example of such scenario is when data is written to volatile memory and shortly thereafter a power down event occurs. If the data just written to volatile memory is to be persisted beyond the power down event, the computing system may read the data from the volatile memory and then write that data to nonvolatile memory. The costs associated with the movement of the data can include the additional computing cycles used to read and write the data as well as a possibly slower write speed associated with nonvolatile memory when compared to volatile memory.

In one configuration, the last write before a power down event may be written into nonvolatile memory with prior writes going into volatile memory. Some inputs to determine the time or point in which a write operation is performed on a nonvolatile memory rather than a volatile memory may include, but are not limited to, a determination of the frequency of writes (e.g., using a probability density function) and a prediction of when the next power down event is to occur. These inputs may be used in a cost function, wherein data is written to nonvolatile memory when the cost of writing to volatile memory is higher than writing to nonvolatile memory.

One example of a cost function may be derived by assuming that the probability of a write being a last write is P. In the present example, V(W) is the cost of writing to volatile memory and NV(W) is the cost of writing to nonvolatile memory. The cost of writing to volatile memory may include copying the data previously written to volatile memory to nonvolatile memory if the data is to be persisted. The costs might be determined as follows. For volatile memory, the cost may be expressed as V: P(V(W)+NV(W))+1−P(V(W))=V(W)+P(NV(W)). For nonvolatile memory, the cost may be expressed as P(NV(W))+1−P(NV(W))=NV(W). The probability P for which both costs are equal may be (NV(W)−V(W))/NV(W). The probability P may be found by starting from V(W)+P(NV(W))=NV(W) and solving for P.

Solving for P indicates that if the probability that a write is the last write prior to a power down event is higher than (NV(W)−V(W))/NV(W), then the cost may be lower to write to the nonvolatile memory. If the probability that a write is the last write prior to a power down event is lower than (NV(W)−V(W))/NV(W), then it may be less costly to write to volatile memory. For example if for V(W) the cost is 2 and for NV(W) the cost is 10, then if the probability that this is the last write is bigger than 80%(10−2)/10, it may be less costly to write to nonvolatile memory.

FIG. 1 is an illustration of memory system 100 operative to determine a write location arranged according to at least some embodiments presented herein. The memory system 100 may include a write location unit 102 that is configured to provide an output as an input to a write logical unit 104 coupled to the write location unit 102. The write logical unit 104 is configured to receive the input from the write location unit 102 and provide an output as an input to a memory controller 106 coupled to the write logical unit 104. The memory controller 106 is configured to receive the input from the write logical unit 104 and is operative to cause data 108 to be written to a system memory 110 coupled to the memory controller 106.

Various components of the memory system 100 may be implemented by software, hardware, or combinations thereof. Further, various components of the memory system 100 may be included as units of other computing systems. For example, the memory controller 106 and the write logical unit 104 may be considered part of the system memory 110. In another example, the write logical unit 104 may be considered part of the memory controller 106. The presently disclosed subject matter is not limited to any particular implementation or configuration.

With reference to FIG. 1, as noted above, the memory controller 106 causes data 108 to be written to the system memory 110. The system memory 110 may include volatile memory 112 and nonvolatile memory 114. The memory controller 106 is configured to receive the input from the write logical unit 104 and, using that input, cause data 108 to be written to either the volatile memory 112 or the nonvolatile memory 114. In some configurations, data 108 may be written to the nonvolatile memory 114 when the cost to write to the nonvolatile memory 114 is lower than the cost to write to the volatile memory 112.

To determine when the cost to write to the nonvolatile memory 114 is lower than the cost to write to the volatile memory 112, the write location unit 102 may include a cost calculator 116. The cost calculator 116 may receive one or more write location inputs 118 and calculate a cost associated with writing to each of the volatile memory 112 and the nonvolatile memory 114. The write location inputs 118 may be received from various information sources. For example, the information sources may include a dynamic profiler 120, a write behavior analyzer 122, and/or a static compiler analyzer 124 and/or other source (s) or combination(s) thereof.

The dynamic profiler 120 may perform a dynamic profiling of an application over a training data set. The dynamic profiling may be configured to emulate an operation of an application being analyzed. In one example, the dynamic profiler 120 may associate instrumentation program code with a write function of a program code used to implement the application being analyzed. The dynamic profiler 120 may generate a hash value of a memory address for the write function using the associated instrumentation program code. The dynamic profiler 120 may then input the generated hash value as an index to a table and increment an index value of the index for the write function.

A frequency of write operations for the application being analyzed may then be calculated using the index value over a period of time. The frequency of write operations may be used to estimate the time at which a next write operation and a last write operation for the application being analyzed may occur before an occurrence of a power down event.

Because in some configurations information received from a dynamic profiling operation is used for performance and not to check errors, the amount of information may be compressed by tolerating a measure of aliasing between different memory addresses mapped to a table entry of the table. In another configuration, the amount of information received from a dynamic profiling operation may be reduced, or compressed, by incrementing the index value of the index for the write function based on a cache block. Thus, writes are calculated on a relatively larger granular level than if incrementing the index value for writes to every memory location.

The write behavior analyzer 122 may operate in conjunction with or separate from the dynamic profiler 120. The write behavior analyzer 122 may be used to generate an estimated time for a last write for an application being analyzed. In one example, the write behavior analyzer 122 may analyze the write behavior of an application by receiving data related to a distribution of write operations per memory address as a function of time for the application. The write behavior analyzer 122 may then determine a rate of write operations per memory address as a function of time based on the distribution of write operations.

A static compiler analyzer 124 might also provide one of the write location inputs 118. The static compiler analyzer 124 is configured to perform a static compiler analysis operation on the application being analyzed. In one example, a static compiler analysis may be an operation wherein the application is compiled and memory accesses are identified. The memory accesses may be analyzed to determine the write behavior of the application.

The write location inputs 118 received from one or more of the dynamic profiler 120, the write behavior analyzer 122 or the static compiler analyzer 124 may be received by the write location unit 102. The write location unit 102 may include the cost calculator 126 and a threshold time generator 128 to provide the input for the write logical unit 104.

In some examples, the cost calculator 126 may receive the write location inputs 118 and determine a cost to write the data 108 to the volatile memory and a cost to write to the nonvolatile memory 114. If the cost to write to the volatile memory 112 is higher than the cost to write to the nonvolatile memory 114, the cost calculator 126 may provide an output to the write logical unit 104. The write logical unit 104 may then send an output to cause the memory controller 106 to have the data 108 written to the nonvolatile memory 114 rather than the volatile memory 112.

If the cost to write to the volatile memory 112 is lower than the cost to write to the nonvolatile memory 114, the cost calculator 126 may provide an output to the write logical unit 104. The write logical unit 104 may then send an output to cause the memory controller 106 to have the data 108 written to the volatile memory 112 rather than the nonvolatile memory 114. In other examples, the cost calculator 126 may receive the write location inputs 118 and determine a cost to write data at a certain time to the volatile memory and a cost to write to the nonvolatile memory 114 at a certain time or point in operation of the application or system effecting or causing memory write operations.

The threshold time generator 128 may provide a time input, such as a threshold time, to the cost calculator 126. In one example, the threshold time is based upon an estimated power down event time and an estimated time for a last write operation of the application prior to the estimated power down event time. The threshold time may include a period of time that leads to the estimated time for the last write operation.

Thus, in one example, prior to the threshold time, the cost calculator 126 may provide an input to the write logical unit 104 to have the memory controller 106 write the data 108 to the volatile memory 112. In another example, at or after the threshold time, the cost calculator 126 may provide an input to the write logical unit 104 to have the memory controller 106 write the data to the nonvolatile memory 114. The threshold time is explained in more detail in FIG. 2.

Figure 2:
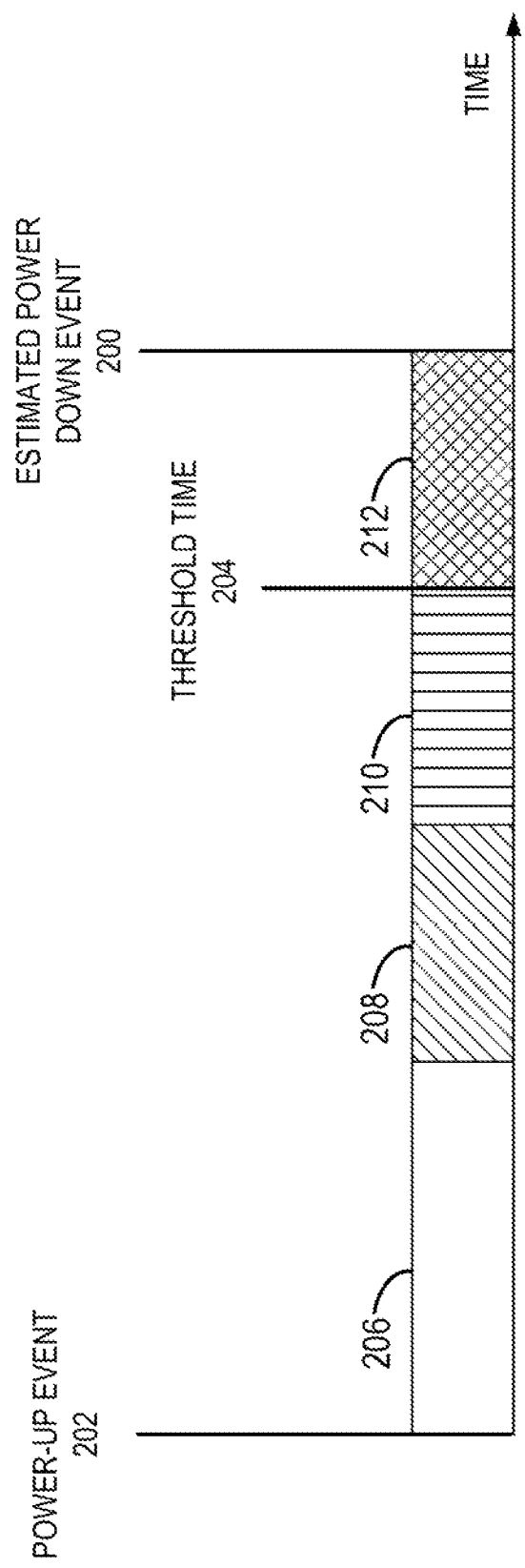
FIG. 2 is an example timing diagram illustrating an estimated power down event that may be used to determine whether to write data to volatile memory or nonvolatile memory.

FIG. 2 is an example timing diagram illustrating an estimated power down event time 200 that may be used to determine whether to write data to the volatile memory 112 or the nonvolatile memory 114 arranged according to at least some embodiments presented herein. The estimated power down event time 200 may be determined by the write location unit 102 based on the write location inputs 118. The estimated power down event time 200 may be an estimated time at which a computing process or application causes a power down event to occur. The write location unit 102 may use the estimated power down event time 200 to determine an output to the write logical unit 104 based on a time between a power-up event 202 and the estimated power down event time 200.

A threshold time 204 may indicate when a cost to write to the volatile memory 112 becomes greater than a cost to write to the nonvolatile memory 114. In one example, the cost to write to the volatile memory 112 prior to the threshold time 204 may be lower than the cost to write to the nonvolatile memory 114. Thus, in this timeframe, represented by time periods 206, 208, and 210, the output from the write logical unit 104 may cause the memory controller 106 to write the data 108 to the volatile memory 112. In another example, the cost to write to the volatile memory 112 at or after the threshold time 204 may be higher than the cost to write to the nonvolatile memory 114. Thus, in this timeframe, represented by time period 212, the output from the write logical unit 104 may cause the memory controller 106 to write the data 108 to the nonvolatile memory 114.

In some examples, the costs to write to the volatile memory 112 and the nonvolatile memory 114 may be based on several factors. The time to the estimated power down event time 200 may be one factor among several, such as, but not limited to, memory availability of either the volatile memory 112 or the nonvolatile memory 114, the current write behavior of a particular application, and/or factor(s) or combination(s) thereof. These and other factors may be dynamic, or changing over time, during the execution of an application or computing process. In some examples, the weights (or significance) of their input may be changed as an input to the cost calculator 126. FIG. 2 provides one such illustration.

Referring again to FIG. 2, the time leading up to the estimated power down event time 200 may be divided into time periods. As discussed above, the time periods 206, 208, 210 and 212 may represent different time periods in relation to the estimated power down event time 200. For example, the time period 206 may be the time period commencing immediately after the power-up event 202. As the time periods approach the estimated power down event time 200, the calculated cost of writing to the volatile memory 112 may increase. This increase in the calculated cost might be based on an assumption of increasing probability that data to be persisted that is in the volatile memory 112 when a power down event occurs may need to be written to the nonvolatile memory 114.

Thus, in the present example, the time periods closer to the estimated power down event time 200 may have a higher weighting factor than those time periods that are closer to the power-up event 202. In one example, the time period 212 may have a weighting factor that, when a write operation occurs in this time period, an overriding factor for cost determination may be the fact that the write occurs after the threshold time 204. In another example, the time period 206 may have a weighting factor that, when a write operation occurs in this time period, the time to the threshold time 204 may be a relatively minor, or insignificant, cost input. While four time periods are displayed in FIG. 2, fewer or more time periods may be used.

Figure 3:
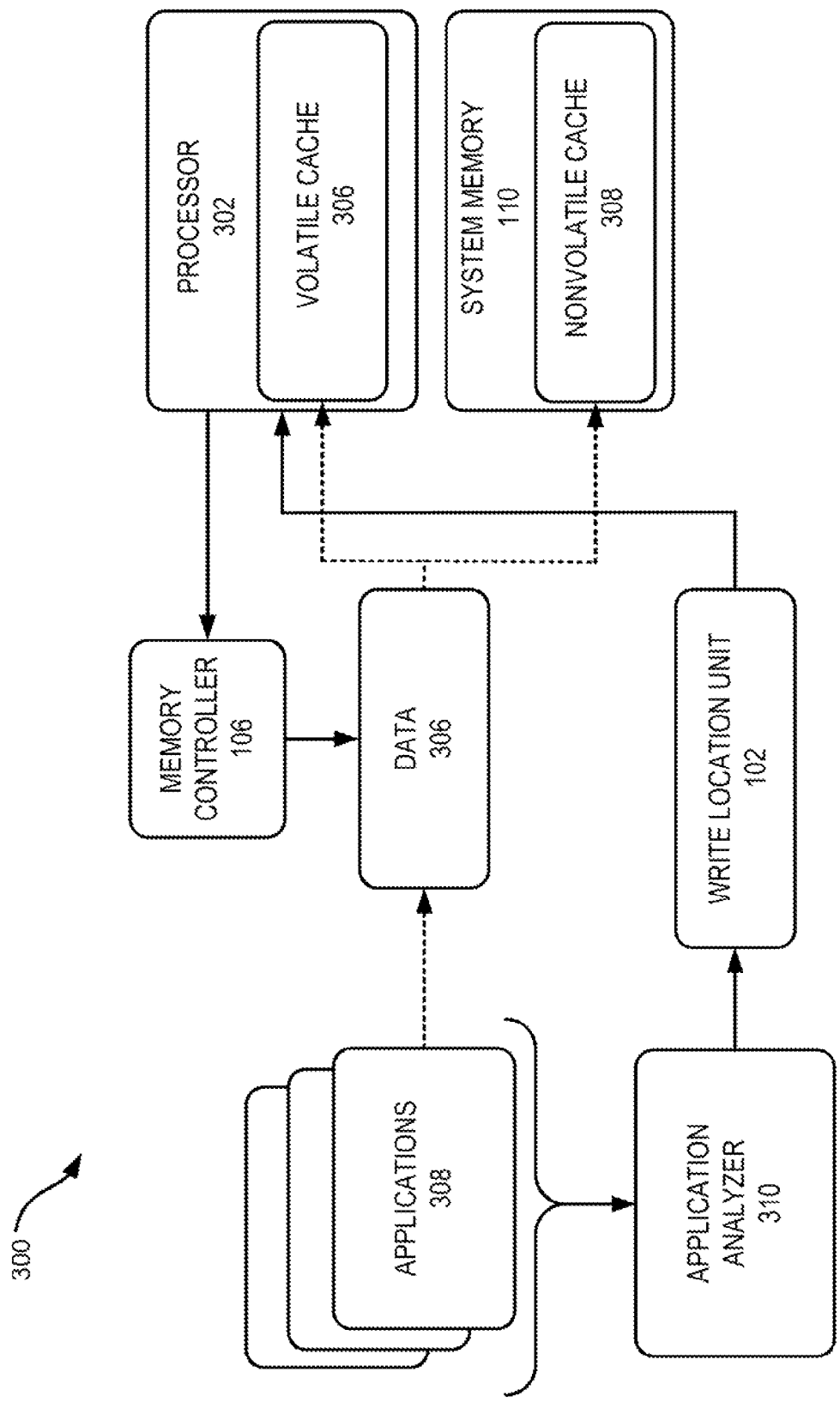
FIG. 3 is an illustration of a circuit that includes a processor and an integrated write location unit.

FIG. 3 is an illustration of a circuit 300 that includes a processor 302 and an integrated write location unit 102 arranged according to at least some embodiments presented herein. The various elements of the circuit 300 shown and described herein may be operatively coupled to each other, and may be implemented in hardware, software (or other computer-readable instruction stored on a non-transitory computer-readable medium and executable by at least one processor), or a combination of both. The processor 302 may instruct the memory controller 106 to store data 306 received from, or generated as a result of the operation of, one or more applications 308 to an on-board volatile cache 306 of the processor 302 or nonvolatile cache 308 in the system memory 110.

In some examples, the cost to write to the volatile cache 306 may be lower than the cost to write to the nonvolatile cache 308. In this example, the processor 302 may provide an output to the memory controller 106 to cause the data 306 to be written to the volatile cache 306. In other examples, the cost to write to the volatile cache 306 may be greater than the cost to write to the nonvolatile cache 308. In this example, the processor 302 may provide an output to the memory controller 106 to cause the data 306 to be written to the nonvolatile cache 308.

The processor 302 may receive an input from the write location unit 102 to generate the output from the processor 302 to the memory controller 106. The write location unit 102 may receive an input from an application analyzer 310. The application analyzer 310 may perform various analysis operations to determine a threshold, such as the threshold time 204 of FIG. 2, wherein the cost to write to the volatile cache 306 becomes greater than the cost to write to the nonvolatile cache 308. The operations may include, but are not limited to, dynamic profile analysis and static compiler analysis. Based on these analysis operations, the application analyzer 310 may provide a result (e.g., an output) to the write location unit 102, which in turn may provide a corresponding output as an input to the processor 302.

Figure 4:
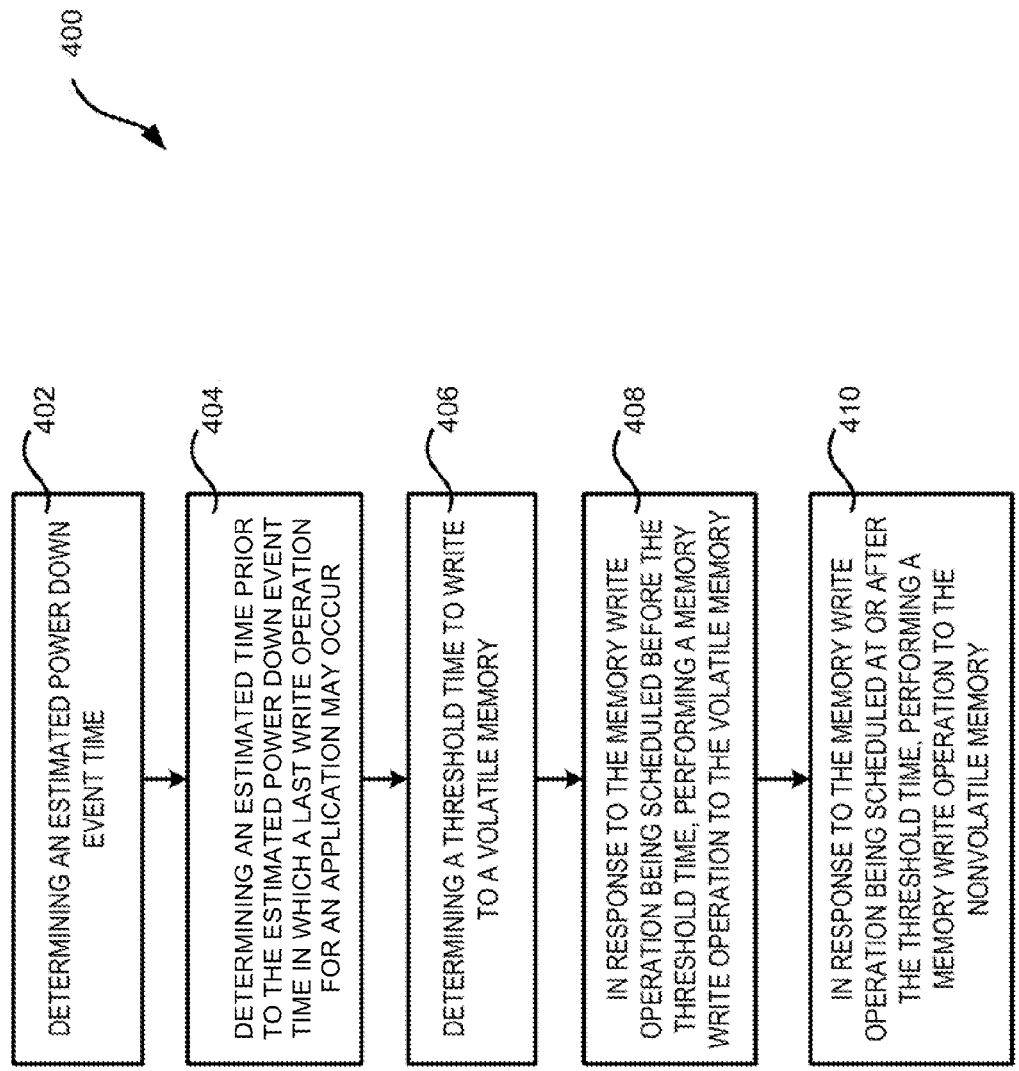
FIG. 4 is a flow diagram illustrating an example process to determine a write operation.

FIG. 4 is a flow diagram illustrating an example process 400 to determine a write location, in accordance with at least some embodiments described herein. The operations of any process described herein are not necessarily presented in any particular order and that performance of some or all of the operations in an alternative order(s) is possible and is contemplated. The operations have been presented in the demonstrated order for ease of description and illustration. Operations may be added, combined, modified, omitted, and/or performed simultaneously, in a different order, etc., without departing from the scope of the present disclosure.

The illustrated processes can be ended at any time and need not be performed in its entirety. Some or all operations of the processes, and/or substantially equivalent operations, can be performed by execution of computer-readable instructions included on a computer storage media, as disclosed herein, including a tangible non-transitory computer-readable storage medium. The term "computer-readable instructions," and variants thereof, as used in the description and claims, is used expansively herein to include routines, applications, application modules, program modules, programs, components, data structures, algorithms, or the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, or the like. For purposes of illustrating and describing at least one embodiment of the present disclosure, the process 400 is described as being performed, at least in part, by the write location unit 102, the write logical unit 104 and the memory controller 106 (which in turn may operate in conjunction with a processor, such as the processor 302). This embodiment is illustrative, and the process 400 may be performed in other ways.

The process 400 may begin at block 402 ("determining an estimated power down event time"), where a determination may be performed to estimate a possible power down event time. In some examples, the write location unit 102 may receive one or more write location inputs 118 to determine costs to write to the volatile memory 112 and the nonvolatile memory 114. Inputs to determine the estimated power down event time may be received from various sources including, but not limited to, the dynamic profiler 120, the write behavior analyzer 122, the static compiler analyzer 124, and/or other component(s) or combination(s) thereof.

The process 400 may continue to block 404 ("determining an estimated time prior to the estimated power down event time in which a last write operation for an application may occur"), where a determination may be performed by the write location unit 102 to estimate a time for a last write operation of an application prior to the determined, estimated power down event time. The input to determine the time estimate for a last write operation may be received from various sources including, but not limited to, the dynamic profiler 120, the write behavior analyzer 122, the static compiler analyzer 124, and/or other component(s) or combination(s) thereof.

The process 400 may continue to block 406 ("determining a threshold time to write to volatile memory"), where the threshold time generator 128 may receive an input from the cost calculator 126 to determine the threshold time 204 to write to the volatile memory 112. The determined threshold time 204 may be based upon at least the determined estimated power down event time 200 and the determined estimated time for the last write operation of the application prior to the estimated power down event time 200. The threshold time may also include one or more periods of time, such as time periods 206, 208, and 210 shown in FIG. 2, which leads to the estimated time for the last write operation or the threshold time 204.

The process 400 may continue to block 408 ("in response to the memory write operation being scheduled before the threshold time, performing a memory write operation to the volatile memory"), where a memory write operation may be performed wherein the data 108 is written (for instance, by the memory controller 106) to the volatile memory 112 if the memory write operation is scheduled to occur before the determined threshold time 204.

The process 400 may continue to (or alternatively may bypass block 408 so as to proceed to) block 410 ("in response to the memory write operation being scheduled at or after the threshold time, performing a memory write operation to the nonvolatile memory"), where a memory write operation may be performed wherein the data 108 is written (for instance, by the memory controller 106) to the nonvolatile memory 114 if the memory write operation is scheduled to occur at or after the determined threshold time 204. The process may thereafter end, repeat, or continue to other operation(s).

Figure 5:
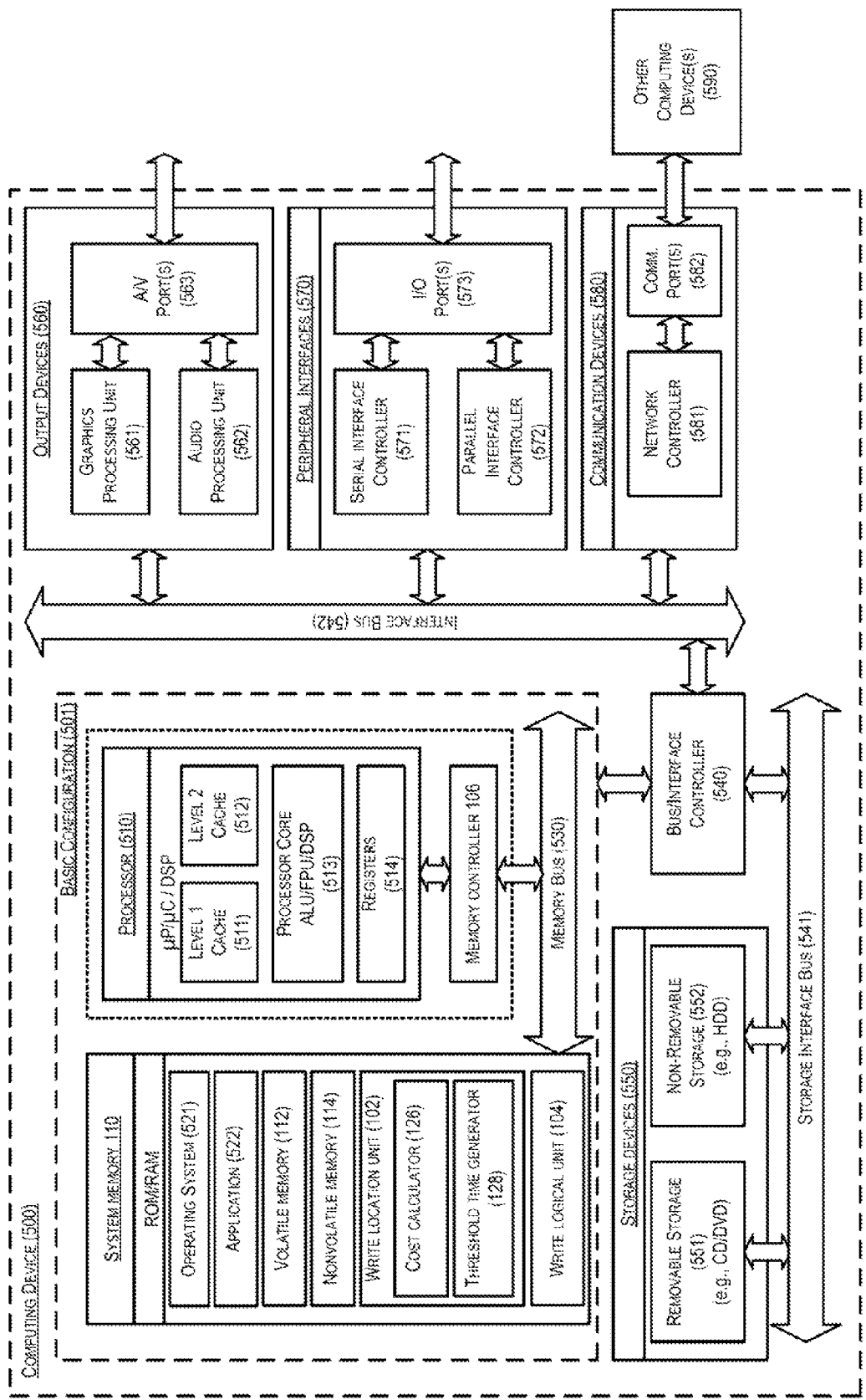
FIG. 5 is a block diagram illustrating an example computing device that is arranged to implement technologies to determine a write operation, all arranged according to at least some embodiments presented herein.

FIG. 5 is a block diagram illustrating an example computing device 500 that is arranged to implement technologies to determine a write location arranged in accordance with at least some embodiments described herein. In a very basic configuration 501, computing device 500 typically includes one or more processors 510 and system memory 110. A memory bus 530 can be used for communicating between the processor 710 and the system memory 110.

Depending on the desired configuration, processor 510 can be of any type including but not limited to a microprocessor ("µP"), a microcontroller ("µC"), a digital signal processor ("DSP"), or any combination thereof. Processor 510 can include one more levels of caching, such as a level one cache 511 and a level two cache 512, a processor core 513, and registers 514. The processor core 513 can include an arithmetic logic unit ("ALU"), a floating point unit ("FPU"), a digital signal processing core ("DSP Core"), or any combination thereof. A memory controller 106 can also be used with the processor 510, or in some implementations the memory controller 106 can be an internal part of the processor 510. The processor 510 can be a multi-core processor having two or more independent processing units ("cores").

Depending on the desired configuration, the system memory 110 can be of any type including but not limited to volatile memory (such as RAM), nonvolatile memory (such as ROM, flash memory, etc.) or any combination thereof. System memory 110 typically includes an operating system 521 and one or more applications 522 (as well as data for the application 522). The system memory 110 may include or be coupled to the write location unit 102 (which in turn may include the cost calculator 126 and the threshold time generator 128) and/or the write logical unit 104. For instance, the write location unit 102 and/or the write logical unit 104 may be embodied as part of the application 522 or other computer-readable instructions stored in the system memory 110, or the write location unit 102 and/or the write logical unit 104 may be operatively coupled to the system memory 110 as external modules/units. The system memory 110 may also include the volatile memory 112 and the nonvolatile memory 114. The write location unit 102 may receive one or more write location inputs 118 and provide an output to the write logical unit 104. The write logical unit 104 may be used by the memory controller 106 to determine where to write the data 108. In some examples, an output of the write location unit 102 may be used by the processor 510. In some embodiments, the volatile memory 112 and/or the non-volatile memory 114 may be located elsewhere, alternatively or additionally to being located in the system memory 110. For instance, the volatile memory 112 and/or the non-volatile memory 114 may be embodied in one or more of the caches of the processor 510, may be embodied in other storage devices of the computing device 500, and/or may be embodied in other storage devices located outside of the computing device 500.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives ("HDD"s), optical disk drives such as compact disk ("CD") drives or digital versatile disk ("DVD") drives, solid state drives ("SSD"s), and tape drives to name a few. Example computer storage media can include volatile and nonvolatile, removable and non-removable media implemented in any method or technology for storage of information, such as computer readable instructions, data structures, program modules, or other data.

System memory 110, removable storage devices 551 and non-removable storage devices 552 are all examples of computer storage media. Computer storage media includes, but is not limited to, RAM, ROM, EEPROM, flash memory or other memory technology, CD-ROM, digital versatile disks ("DVD"s) or other optical storage, magnetic cassettes, magnetic tape, magnetic disk storage or other magnetic storage devices, or any other medium which can be used to store the desired information and which can be accessed by computing device 500. Any such computer storage media can be part of the computing device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582. The communication connection is one example of a communication media.

Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, communication media can include wired media such as a wired network or direct-wired connection, and wireless media such as acoustic, radio frequency ("RF"), infrared ("IR"), Fiber Optics, and other wireless media. The term computer readable media as used herein can include both storage media and communication media.

Computing device 500 can be implemented as a portion of a small-form factor portable (or "mobile") electronic device such as a cell phone, a personal data assistant ("PDA"), a personal media player device, a wireless web-watch device, a personal headset device, an application specific device, or a hybrid device that include any of the above functions. Computing device 500 can also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible. Such modifications and variations are intended to fall within the scope of the appended claims. The present disclosure is to be limited only by the terms of the appended claims, along with the full scope of equivalents to which such claims are entitled. This disclosure is not limited to particular methods, compounds, or compositions, which can, of course, vary. The terminology used herein is for the purpose of describing particular embodiments only, and is not intended to be limiting. Additionally, for purposes of clarity, one or more components of the circuits in the figures may not be illustrated but may be included. Other memory access technologies and techniques may be used and are still considered to be within the scope of the present disclosure. The circuits illustrated are not limited to the components illustrated and may include more or fewer components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

Further, the use of the terms "first," "second," "third," "fourth," and the like is to distinguish between repeated instances of a component or a step in a process and does not impose a serial or temporal limitation unless specifically stated to require such serial or temporal order.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to perform a write operation, the method comprising:
   determining an estimated power down event time;
   determining an estimated time prior to the estimated power down event time in which a last write operation for an application may occur;
   determining a threshold time to write to a volatile memory based upon at least the determined estimated power down event time and the determined estimated time in which the last write operation for the application may occur;
   determining whether a memory write operation is scheduled to occur before or after the determined threshold time;
   after determining whether the memory write operation is scheduled to occur before or after the determined threshold time, and in response to determining that the memory write operation is scheduled to occur before the determined threshold time, performing the memory write operation to the volatile memory; and
   in response to the memory write operation being scheduled to occur at or after the determined threshold time, performing the memory write operation to a nonvolatile memory.

2. The method of claim 1, wherein the threshold time to write to the volatile memory is based upon a cost to write to the nonvolatile memory or to the volatile memory.

3. The method of claim 1, wherein determining the estimated power down event time comprises receiving data related to a distribution of power down events as a function of time, and utilizing at least the received data related to the distribution of power down events to determine the estimated power down event time.

4. The method of claim 1, wherein determining the estimated time comprises analyzing a write behavior of the application to generate the estimated time.

5. The method of claim 4, wherein analyzing the write behavior of the application comprises receiving data related to a distribution of write operations per memory address as a function of time for the application and determining a rate per memory address as a function of time of write operations based on the received data related to the distribution of write operations.

6. A method to perform a write operation, the method comprising:
   determining an estimated power down event time;
   determining an estimated time prior to the estimated power down event time in which a last write operation for an application may occur;
   determining a threshold time to write to a volatile memory based upon at least the determined estimated power down event time and the determined estimated time in which the last write operation for the application may occur;
   in response to a memory write operation being scheduled to occur before the determined threshold time, performing the memory write operation to the volatile memory; and
   in response to the memory write operation being scheduled to occur at or after the determined threshold time, performing the memory write operation to a nonvolatile memory,
   wherein determining the estimated power down event time includes determining the estimated power down event time based at least in part upon data collected by static compiler analysis.

7. A method to perform a write operation, the method comprising:
   determining an estimated power down event time;
   determining an estimated time prior to the estimated power down event time in which a last write operation for an application may occur;
   determining a threshold time to write to a volatile memory based upon at least the determined estimated power down event time and the determined estimated time in which the last write operation for the application may occur;
   in response to a memory write operation being scheduled to occur before the determined threshold time, performing the memory write operation to the volatile memory; and
   in response to the memory write operation being scheduled to occur at or after the determined threshold time, performing the memory write operation to a nonvolatile memory,
   wherein determining the estimated power down event time includes determining the estimated power down event time based at least in part by performing a dynamic profiler operation over a trainer data set configured to emulate an operation of the application.

8. The method of claim 7, wherein performing the dynamic profiler operation comprises:
   associating instrumentation program code with a write function of program code used to implement the application;
   generating a hash value of a memory address for the write function with the associated instrumentation program code;
   inputting the generated hash value as an index to a table; and
   incrementing an index value of the index for the write function.

9. The method of claim 8, wherein performing the dynamic profiler operation further comprises calculating a frequency of write operations with the index value of the index over a period of time.

10. The method of claim 9, wherein performing the dynamic profiler operation further comprises estimating a next write operation based on the frequency of write operations.

11. The method of claim 8, wherein performing the dynamic profiler operation further comprises reducing an amount of information by limiting a number of hash value entries for the hash value.

12. The method of claim 8, wherein performing the dynamic profiler operation further comprises reducing an amount of information by tolerating a measure of aliasing between different memory addresses mapped to a table entry of the table.

13. The method of claim 8, wherein performing the dynamic profiler operation further comprises reducing an amount of information by incrementing the index value of the index for the write function based on a cache block.

14. A non-transitory computer-readable storage medium comprising computer-executable instructions stored therein which, in response to execution by a computer, cause the computer to perform or control performance of the method of claim 1.

15. An apparatus, comprising:
a processor unit; and
a memory controller coupled to the processor unit and configured to:
be responsive to the processor unit to perform a memory write operation to either a volatile memory or a nonvolatile memory in accordance with a threshold time, wherein the threshold time is based on:
an estimated power down event time of an application associated with the memory write operation, and
an estimated time prior to the estimated power down event time in which a last write operation for the application may occur,
associate instrumentation code with a write function of the application;
generate a hash value of a memory address for the write function with the instrumentation code;
input the hash value as an index to a table;
increment a value of the index for the write function;
calculate a frequency of write operations with the value of the index over a period of time; and
estimate a next write operation based on the frequency of write operations, wherein the estimated next write operation is used as an input to determine the estimated time in which the last write operation for the application may occur.

16. The apparatus of claim 15, wherein to perform the memory write operation in accordance with the threshold time, the memory controller is configured to:
perform the memory write operation to the volatile memory if the memory write operation is scheduled to occur before the threshold time, and
perform the memory write operation to the nonvolatile memory if the memory write operation is scheduled to occur at or after the threshold time.

* * * * *